US010697587B2

(12) United States Patent
Campbell

(10) Patent No.: US 10,697,587 B2
(45) Date of Patent: Jun. 30, 2020

(54) OPERATOR PROTECTION SYSTEM FOR ELECTRIC SAW

(71) Applicant: Scott Automation & Robotics Pty Ltd, Silverwater, New South Wales (AU)

(72) Inventor: Clyde Mark Campbell, Mosman (AU)

(73) Assignee: Scott Automation & Robotics Pty Ltd., Silverwater, New South Wales (AU)

(*) Notice: Subject to any disclaimer, the term of this patent is extended or adjusted under 35 U.S.C. 154(b) by 626 days.

(21) Appl. No.: 15/515,180

(22) PCT Filed: Sep. 28, 2015

(86) PCT No.: PCT/AU2015/050578
§ 371 (c)(1),
(2) Date: Mar. 29, 2017

(87) PCT Pub. No.: WO2016/049690
PCT Pub. Date: Apr. 7, 2016

(65) Prior Publication Data
US 2017/0227163 A1 Aug. 10, 2017

(30) Foreign Application Priority Data
Sep. 29, 2014 (AU) ................... 2014903866

(51) Int. Cl.
*F16P 3/14* (2006.01)
*B27G 19/06* (2006.01)
(Continued)

(52) U.S. Cl.
CPC ............... *F16P 3/14* (2013.01); *B23D 55/00* (2013.01); *B23D 59/001* (2013.01); *B27B 13/14* (2013.01);
(Continued)

(58) Field of Classification Search
CPC . A22C 17/0086; A22C 21/0076; A22C 25/18; A22C 17/004; A22C 21/0069;
(Continued)

(56) References Cited

U.S. PATENT DOCUMENTS 6,024,636 A * 2/2000 Hazenbroek ....... A22C 21/0076
452/136
7,924,164 B1 4/2011 Staerzl
(Continued)

FOREIGN PATENT DOCUMENTS

BR 10 2012 025428-0 A2 5/2012
JP H09155789 A 6/1997
(Continued)

OTHER PUBLICATIONS

International Search Report for International Application No. PCT/AU2015/050578 dated Nov. 16, 2015 (3 pages).

*Primary Examiner* — Aklilu K Woldemariam
(74) *Attorney, Agent, or Firm* — Merchant & Gould P.C.

(57) ABSTRACT

A safety apparatus for protecting an operator of an electrically powered saw from the blade during operation, the saw being of the type including a cutting table through which the blade passes, comprising: an image processing arrangement operable to sense, within a predefined three-dimensional sensing zone, the presence of a glove worn by the operator which has a colour distinguishable by the image sensor from the colour of an object being cut by the blade, the three-dimensional sensing zone being located in a cutting path of the blade; and an electronic controller communicable with the image sensor and operable to control an arresting mechanism to arrest movement of the blade responsive to the coloured glove being detected within the three-dimensional sensing zone.

19 Claims, 6 Drawing Sheets

(51) Int. Cl.
  *B23D 59/00* (2006.01)
  *B23D 55/00* (2006.01)
  *B27B 13/14* (2006.01)
  *G01V 8/10* (2006.01)
  *G01V 8/20* (2006.01)
  *A22B 5/20* (2006.01)
  *G08B 23/00* (2006.01)

(52) U.S. Cl.
  CPC .............. *B27G 19/06* (2013.01); *F16P 3/142* (2013.01); *G01V 8/10* (2013.01); *A22B 5/208* (2013.01); *G01V 8/20* (2013.01); *G08B 23/00* (2013.01)

(58) Field of Classification Search
  CPC ....... A22C 17/02; A22C 11/00; A22C 11/003; B26D 1/26; B26D 1/45; B26D 1/60; B26D 3/08; B26D 5/007; B26D 5/34; B26D 7/0625; B26D 9/00; B26F 3/004; A22B 5/0035; A22B 5/0017; F16P 3/142; F16P 3/144; F16P 3/147; F16P 3/14; G01V 8/10; G01V 8/20; H04N 13/20; H04N 13/239; H04N 7/181; A61B 17/07207; A61B 2090/064; A61B 90/361; A61B 2017/00022; A61B 2017/0003; A61B 2090/061; A61B 2090/066; A61B 5/0095; A61B 90/30; A61B 5/0064; A61B 5/411; B60N 2002/0268; B60R 21/01552; G01C 11/06; G01S 13/04; G01S 15/04; G06K 9/00228; G06K 9/00255; G06T 7/97

USPC ...... 348/46, 47; 382/103, 154; 452/136, 138
See application file for complete search history.

(56) References Cited

U.S. PATENT DOCUMENTS

| | | | |
|---|---|---|---|
| 2002/0170399 A1* | 11/2002 | Gass | B23D 59/001 83/62.1 |
| 2007/0085502 A1 | 4/2007 | Graves | |
| 2007/0275647 A1* | 11/2007 | Eger | A22B 5/0035 452/156 |
| 2009/0128577 A1* | 5/2009 | Gloudemans | G06T 15/20 345/582 |
| 2009/0129666 A1* | 5/2009 | Goevert | G01C 11/06 382/154 |
| 2010/0045423 A1* | 2/2010 | Glickman | G06Q 10/087 340/5.1 |
| 2010/0300256 A1* | 12/2010 | Loewe | B23Q 11/0082 83/72 |
| 2012/0190284 A1* | 7/2012 | Hazenbroek | A22C 21/0076 452/136 |
| 2013/0196582 A1* | 8/2013 | Stooker | A22B 5/0035 452/136 |
| 2013/0201292 A1* | 8/2013 | Walter | G01V 8/10 348/47 |
| 2017/0334087 A1* | 11/2017 | Gass | B27G 19/00 |
| 2018/0260602 A1* | 9/2018 | He | G06K 9/0008 |

FOREIGN PATENT DOCUMENTS

| | | |
|---|---|---|
| WO | 86/06816 | 11/1986 |
| WO | 2005/068896 A1 | 7/2005 |
| WO | 2007/009172 A1 | 1/2007 |

\* cited by examiner

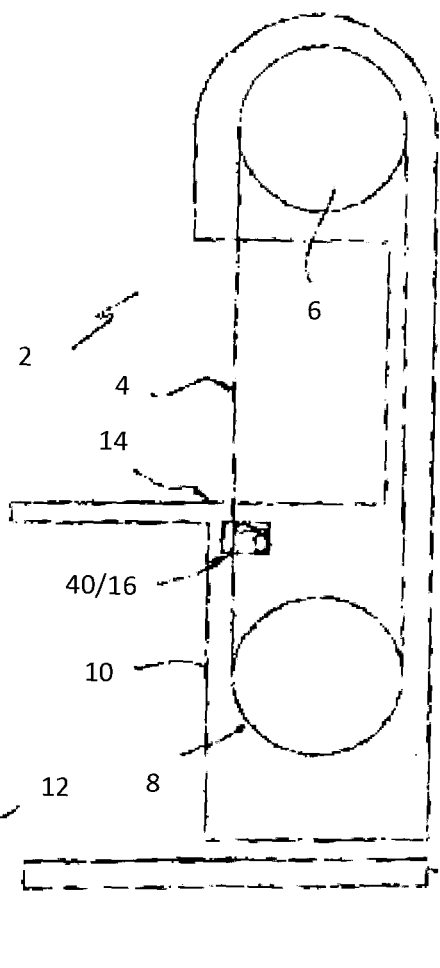
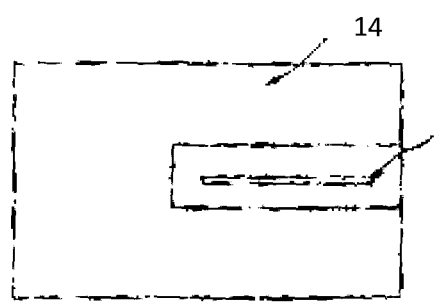
Fig. 1
Fig. 2

OPERATOR PROTECTION SYSTEM FOR ELECTRIC SAW

This application is a National Stage Application of PCT/AU2015/050578, filed 28 Sep. 2015, which claims benefit of Serial No. 2014903866, filed 29 Sep. 2014 in Australia and which applications are incorporated herein by reference. To the extent appropriate, a claim of priority is made to each of the above disclosed applications.

FIELD OF THE INVENTION

The present invention relates to a system and method for protecting an operator from the blade of an electric saw. The invention finds particular application for use with saws commonly used in the meat processing industry.

BACKGROUND OF THE INVENTION

Band saws are commonly used to cut carcasses and meat sections in the red meat industry as part of the meat processing stage. When using a band saw, the operator physically holds the carcass or meat section either side of the band saw blade and drives the meat into the blade to effect the cutting operation. This inherently places the operator at risk of contacting the blade in the event of slipping or for example as a result of inattention.

While guards can be used to cover the blade, a region of the blade remains exposed to the operator. For larger cuts of meat and carcasses, a significant section of the blade must remain exposed. Contact with the blade can result in serious injury including loss of digits and worse. Once an operator recognizes they have come into contact with the blade and takes corrective action, there is nevertheless a time delay involved in which significant injury can be sustained from the blade. Similarly, even if an emergency stop button is activated, the motor may still undergo several rotations before being brought to a stop with continued resulting travel of the blade.

Injuries to operators can be debilitating for the operator, distressing to all involved, and costly to employers in terms of downtime, loss of productivity and associated rehabilitation of the employee.

SUMMARY OF THE INVENTION

According to one aspect of the present invention there is provided a safety apparatus for protecting an operator of an electrically powered saw from the blade during operation, the saw being of the type including a cutting table through which the blade passes, comprising: an image processing arrangement operable to sense, within a predefined three-dimensional sensing zone, the presence of a glove worn by the operator which has a colour distinguishable by the image sensor from the colour of an object being cut by the blade, the three-dimensional sensing zone being located in a cutting path of the blade; and an electronic controller communicable with the image processing arrangement and operable to control an arresting mechanism to arrest movement of the blade responsive to the coloured glove being detected within the three-dimensional sensing zone.

In an embodiment the image processing arrangement comprises one or more colour sensors operable to sense a range of colours and/or colour gradients for determining the presence of the coloured glove within the three-dimensional object zone.

In an embodiment the one or more colour sensors are mounted above the cutting table.

In an embodiment the arresting mechanism comprises a clamping arrangement for clamping the blade to arrest its movement.

In an embodiment the clamping arrangement comprises a pair of clamping members disposed in a side by side relationship for reception of the blade therebetween and wherein responsive to the coloured glove being determined the clamping members clamp the blade to arrest movement.

In an embodiment the apparatus further comprises a light source operable to project light in the three-dimensional sensing zone so as to assist with detection of the coloured glove by the image sensing apparatus.

In an embodiment the three dimensional zone has a longitudinal axis which is aligned with the cutting blade.

In an embodiment the three dimensional zone has a substantially rectangular shape.

In an embodiment the three dimensional zone has a shape which is configurable by the controller depending on the object being cut.

In an embodiment the electrically powered saw is a band saw for cutting meat.

In an embodiment the colour of the glove is blue.

In accordance with a second aspect there is provided a method for protecting an operator of an electrically powered saw from the blade during operation, the saw being of the type including a cutting table through which the blade passes, and the method comprising: providing a coloured glove to be worn by the operator; providing an image processing and control arrangement operable to sense, within a predefined three-dimensional sensing zone, the presence of the glove worn by the operator and which has a colour which is distinguishable by the image sensor from an object being cut by the blade, the three-dimensional sensing zone being located in a cutting path of the blade; and responsive to the image processing and control arrangement determining the occurrence of the coloured glove within the three-dimensional sensing zone, controlling an arresting mechanism to arrest movement of the blade.

In an embodiment the image processing arrangement comprises one or more colour sensors operable to sensor a range of colours and/or colour gradients for determining the presence of the coloured glove within the three-dimensional object zone.

In an embodiment the one or more colour sensors are mounted above the cutting table.

In an embodiment the arresting mechanism comprises a clamping arrangement for clamping the blade to arrest its movement.

In an embodiment the clamping arrangement comprises a pair of clamping members disposed in a side by side relationship for reception of the blade therebetween and wherein responsive to the coloured glove being determined the clamping members clamp the blade to arrest movement.

In an embodiment the method further comprises illuminating the three-dimensional sensing zone so as to assist with detection of the coloured glove by the image sensing apparatus.

In an embodiment the three dimensional zone has a longitudinal axis which is aligned with the cutting blade.

In an embodiment the three dimensional zone has a substantially rectangular shape.

In an embodiment the three dimensional zone has a shape which is configurable by the controller depending on the object being cut.

In an embodiment the electrically powered saw is a band saw for cutting meat.

As will be appreciated, the use of an embodiment of the invention on a saw may save operators from amputations or significantly lessen the seriousness of injury resulting from contact with the blade of the saw. While saws of the invention find particular application to the red meat processing industry, it will be understood that embodiments of the invention have broader application and the invention is not limited thereto.

Any publications mentioned in this specification are herein incorporated by reference. Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers, integers or steps.

The features and advantages of methods of the present invention will become further apparent from the following detailed description of preferred embodiments and the accompanying figures.

BRIEF DESCRIPTION OF THE ACCOMPANYING FIGURES

FIG. 1 shows a front schematic view of a band saw incorporating a safety apparatus in accordance with an embodiment of the present invention;

FIG. 2 shows a plan schematic view of the band saw of FIG. 1;

DETAILED DESCRIPTION OF PREFERRED EMBODIMENTS OF THE INVENTION

Figure 3:
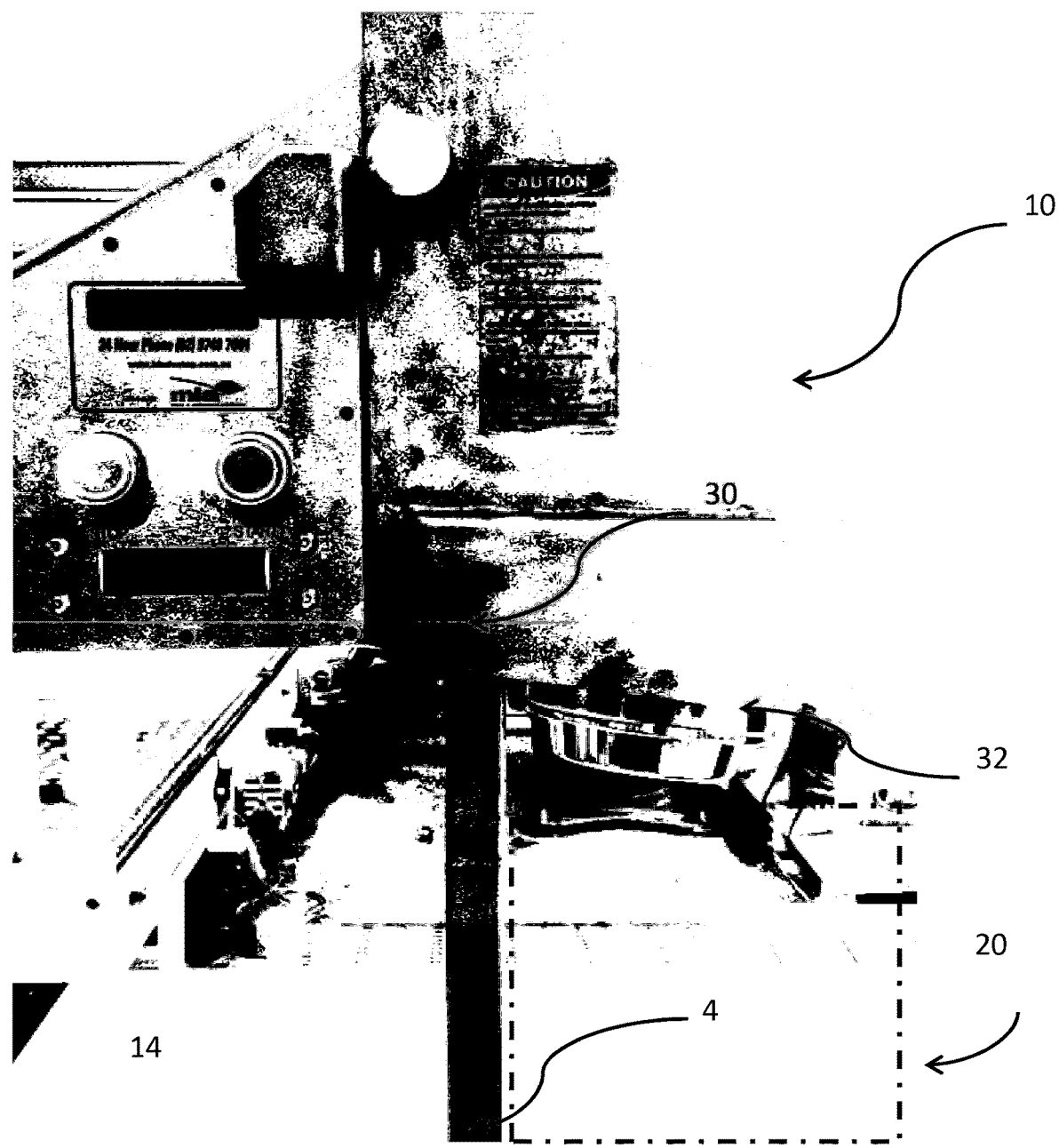
FIG. 3 shows a partial side view of the band saw of FIG. 1.

Embodiments of the present invention will hereafter be described in the context of an apparatus and method for protecting an operator of an electrically powered saw in the form of a band saw. It will be understood, however, that embodiments may be suitable for use with any saw being of the type including a cutting table through which the saw blade passes.

With reference to FIG. 1, there is shown a band saw 2 in accordance with an embodiment. The band saw 2 is particularly suited for cutting the carcass of an animal during processing of the carcass to provide cuts of red meat and comprises an endless blade 4 driven around an upper pulley wheel 6 by a lower drive wheel 8. The drive wheel 8 in turn is driven by a motor (not shown) encased in housing 10 of the saw. The blade passes through a slit 12 in the cutting table 14 as indicated in FIG. 2.

Figure 4:
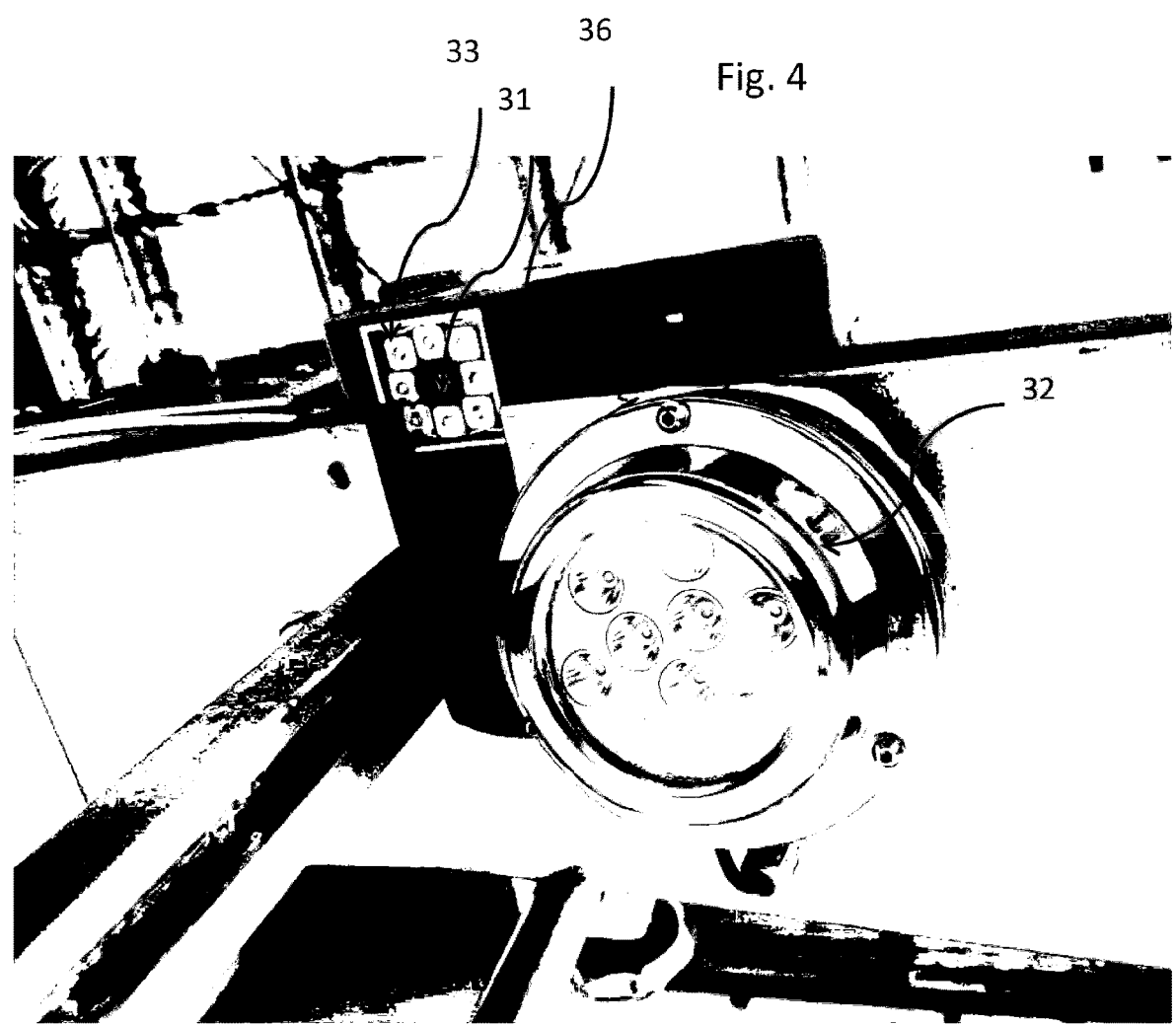
FIG. 4 shows a close-up view of an image sensor arrangement of the band saw of FIG. 1.

With additional reference to FIGS. 3 and 4, a safety apparatus for protecting an operator of the band saw 2 comprises an image processing and control arrangement implementing a vision sensor 30. More particularly, the vision sensor 30 comprises a digital camera 31 comprising a Complementary Metal-Oxide Semiconductor (CMOS) image sensor. It will be understood that the resolution of the digital camera may vary, depending on the desired implementation, but according to the presently described embodiment has a resolution of 760,000 pixels. The digital camera 31 is positioned above the cutting table 14 and is configured to capture images within a three-dimensional object sensing zone 20 located in a cutting path of the blade 4. A light source is provided for illuminating the cutting table 14 to achieve a sharp image contrast and colour definition for object detection by the vision sensor 30. According to the illustrated embodiment, two alternative light sources are provided, including a high power LED light source 33 surrounding the camera 31 and a panel of super bright LEDs 32 located in front of the cutting blade 4.

To carry out the necessary image processing for object detection, the arrangement further includes a high speed image processor 36 which is electronically communicable with the digital camera 31 (it will be understood that the processor 36 could be integrated with the digital camera 31, or implemented separately thereof). According to embodiments described herein, the high speed image processor 36 is configured to perform high speed processing of colour images captured by the digital camera 31. More particularly, the processor 36 is operable to perform high speed image processing to determine whether an object of a predefined recognizable colour is present within a programmable three dimensional image profile within the sensed zone. An output of the high speed image processor 36 (in this case either a positive output indicating that there is a programmed colour in the programmable sensing zone or a negative output indicating that there is not a programmable colour in the sensing zone) is communicated to a microprocessor 40 which controls operation of blade arresting mechanism 16. It will be understood that the output can be any suitable form of digital signal recognisable by the microprocessor 40. According to the presently described embodiment, the high speed image processor 36 is communicable with the microprocessor 40 via an Ethernet connection. An example integrated camera and high speed processor 36 suitable for use with embodiments described herein is the CV-5000 Multi-Camera Super-High-Speed Machine Vision, manufactured by Keyence Corporation (see http://www.keyence.com/usa.jsp). It will be understood, however, that any suitable high speed image processing componentry and camera (e.g. CCD, etc.) could be used, depending only on the desired implementation.

Figure 5:
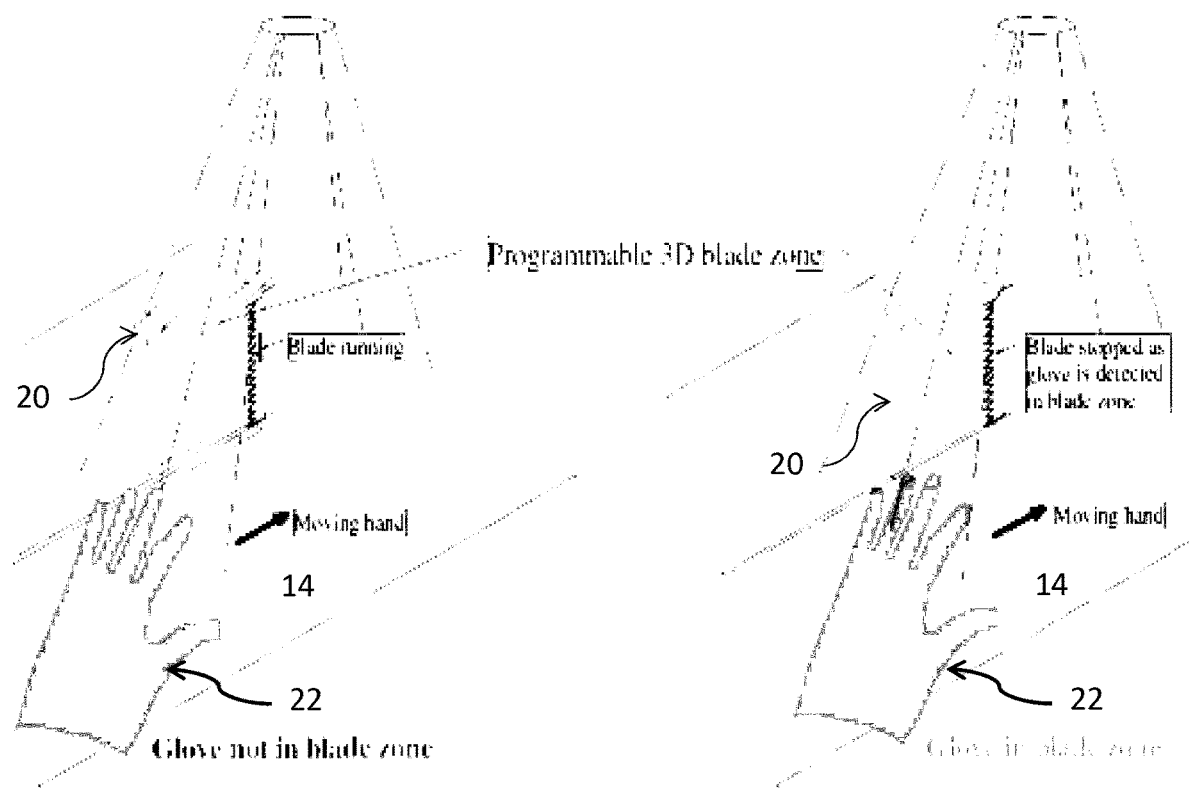
FIG. 5 is a schematic illustrating operation of the safety apparatus.
Figure 6A:
FIG. 6 is a schematic of a blade arresting mechanism in accordance with an embodiment.
Figure 6B:
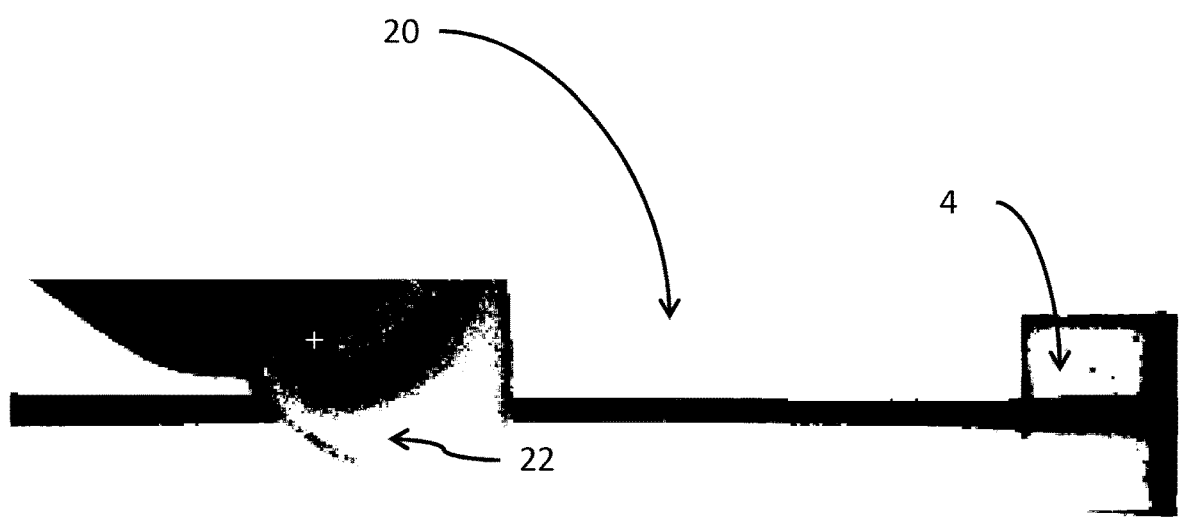

According to the illustrated embodiment, the high speed image processor 36 is configured to detect the presence of a glove 22 worn by the operator which has a colour distinguishable by the vision sensor 30 from both a colour of the meat and any saw equipment within the sensed zone (e.g. cutting table, saw blade, etc.). In a particular embodiment in which the saw is being used to cut red meat, the high speed image processor 36 is configured to detect the presence of a blue glove worn by the operator within a generally rectangular profile having a longitudinal axis aligned with that of the cutting blade 4. Such a configuration is shown in FIG. 5. It will be understood that the three-dimensional profile can be readily modified (i.e. to correspond to any desired profiled within an area recorded by the vision sensor 30) by suitably programming the high speed image processor 36, depending only on the desired implementation. FIGS. 6a and 6b show example output images from the sensor 30, where FIG. 6a is representative of a "no glove detection" output and FIG. 6b is representative of a "glove detected" output.

As mentioned above, the high speed image processor 36 is communicable with a microprocessor 40 controlling operation of a blade arresting mechanism 16. More particularly, the microprocessor 40 is operable to control the mechanism 16 to arrest movement of the blade 4, based on the output from the high speed image processor 36. According to the illustrated embodiment, the blade arresting mechanism 16 takes the form of a clamping mechanism as generally described in co-pending Australian Provisional Patent Application No. 2014903735 (to the same applicant), the contents of which are incorporated herein by reference. Such a clamping mechanism comprises a fixed jaw and moving jaw which are operable to clamp and thus arrest movement of the saw blade 4 (located there between). The moving jaw is moved into clamping position by a piston rod which is in turn driven by high pressure fluid supplied by cylinder. The actuation of the cylinder is initiated via a signal received from the high speed image processor 36 (i.e. responsive to determining the presence of the operator's glove within the three-dimensional sensed zone). Once the moving jaw has been moved into the clamping position (which takes a matter of milliseconds), the blade is prevented from further travel in turn minimizing injury to the operator.

It will be understood that the blade arresting mechanism may take on a form other than described above, provided it is capable of arresting movement of the blade 4 in a short time period. For example, in an alternative embodiment, the blade arresting mechanism may take the form of any one of the clamping mechanisms described in published PCT application no. PCT/AU2006/001010 (also to the same applicant), the contents of which are incorporated herein by reference.

Briefly, the high speed image processor 36 of the illustrated embodiment communicates with a dual microprocessor system with redundant circuits for all sensing inputs. The dual microprocessors utilized in this embodiment ensure the control system will still function to disable the saw in the unlikely event of one of the processors failing. The microprocessors are configured to communicate with each other to establish each others operational status and should they not correspond correctly, the band saw is disabled from operation. The control system of this embodiment also monitors mechanical response time and should this time be out of specification, disables the band saw.

It will be understood by persons skilled in the art that numerous variations and/or modifications may be made to the invention without departing from the spirit or scope of the invention as broadly described. For example, the skilled addressee would be able to readily modify the control system yet still obtain clamping of the blade of the saw. The present embodiments are, therefore, to be considered in all respects as illustrative and not restrictive.

The invention claimed is:

1. A safety apparatus for protecting an operator of an electrically powered saw from a blade during operation, the saw being of the type including a cutting table through which the blade passes, comprising:
   an image processing arrangement operable to sense, within a predefined three-dimensional sensing zone, the presence of a coloured glove worn by the operator which has a colour distinguishable by the image sensor from a colour of an object being cut by the blade, the three-dimensional sensing zone being located in a cutting path of the blade; and
   an electronic controller communicable with the image processing arrangement and operable to control an arresting mechanism to arrest movement of the blade responsive to the coloured glove being detected within the three-dimensional sensing zone;
   wherein the three-dimensional sensing zone has a shape which is configurable by the controller depending on the object being cut, and wherein the shape has a generally rectangular profile having a longitudinal axis aligned with that of the blade.

2. A safety apparatus in accordance with claim 1, wherein the image processing arrangement comprises one or more colour sensors operable to sense a range of colours and/or colour gradients for determining the presence of the coloured glove within the three-dimensional object zone.

3. A safety apparatus in accordance with claim 2, wherein the one or more colour sensors are mounted above the cutting table.

4. A safety apparatus in accordance with claim 1, wherein the arresting mechanism comprises a clamping arrangement for clamping the blade to arrest its movement.

5. A safety apparatus in accordance with claim 4, wherein the clamping arrangement comprises a pair of clamping members disposed in a side by side relationship for reception of the blade therebetween and wherein responsive to the coloured glove being determined the clamping members clamp the blade to arrest movement.

6. A safety apparatus in accordance with claim 1, further comprising a light source operable to project light in the three-dimensional sensing zone so as to assist with detection of the coloured glove by the image sensing apparatus.

7. A safety apparatus in accordance with claim 1, wherein the three dimensional zone has a longitudinal axis which is aligned with the cutting blade.

8. A safety apparatus in accordance with claim 7, wherein the three dimensional zone has a substantially rectangular shape.

9. A safety apparatus in accordance with claim 1, wherein the electrically powered saw is a band saw for cutting meat.

10. A safety apparatus in accordance with claim 1, wherein the colour of the glove is blue.

11. A method for protecting an operator of an electrically powered saw from a blade of the saw during operation, the saw being of the type including a cutting table through which the blade passes, and the method comprising:
   providing a coloured glove to be worn by the operator;
   providing an image processing and control arrangement operable to sense, within a predefined three-dimensional sensing zone, the presence of the coloured glove worn by the operator and which has a colour which is distinguishable by the image processing and control arrangement from an object being cut by the blade, the three-dimensional sensing zone being located in a cutting path of the blade; and
   responsive to the image processing and control arrangement determining the presence of the coloured glove within the three-dimensional sensing zone, controlling an arresting mechanism to arrest movement of the blade;
   wherein the three-dimensional sensing zone has a shape which is configurable by the image processing and control arrangement depending on the object being cut, and wherein the shape has a generally rectangular profile having a longitudinal axis aligned with that of the blade.

12. A method in accordance with claim 11, wherein the image processing arrangement comprises one or more colour imaging cameras operable to capture an image of the three dimensional sensing zone and the arrangement further comprising a processor for processing the image to determine the presence of the coloured glove within the captured image.

13. A method in accordance with claim 12, wherein the one or more colour sensors are mounted above the cutting table.

14. A method in accordance with claim 11, wherein the arresting mechanism comprises a clamping arrangement for clamping the blade to arrest its movement.

15. A method in accordance with claim 14, wherein the clamping arrangement comprises a pair of clamping members disposed in a side by side relationship for reception of the blade therebetween and wherein responsive to the coloured glove being determined the clamping members clamp the blade to arrest movement.

16. A method in accordance with claim 11, further comprising illuminating the three-dimensional sensing zone so as to assist with detection of the coloured glove by the image processing and control arrangement.

17. A method in accordance with claim 11, wherein the three dimensional zone has a longitudinal axis which is aligned with the cutting blade.

18. A method in accordance with claim 17, wherein the three dimensional zone has a substantially rectangular shape.

19. A method in accordance with claim 11, wherein the electrically powered saw is a band saw for cutting meat.

\* \* \* \* \*